United States Patent
Tamaki et al.

(10) Patent No.: US 9,331,362 B2
(45) Date of Patent: May 3, 2016

(54) BATTERY HAVING ELECTRODE WITH CARBON CURRENT COLLECTOR

(75) Inventors: Ryo Tamaki, Santa Clarita, CA (US); Hisashi Tsukamoto, La Canada Flintridge, CA (US); Mikito Nagata, Saugus, CA (US)

(73) Assignee: Quallion LLC, Sylmar, CA (US)

(*) Notice: Subject to any disclaimer, the term of this patent is extended or adjusted under 35 U.S.C. 154(b) by 1425 days.

(21) Appl. No.: 12/655,103

(22) Filed: Dec. 21, 2009

(65) Prior Publication Data

US 2014/0335418 A1 Nov. 13, 2014

(51) Int. Cl.
| | |
|---|---|
| *H01M 10/0583* | (2010.01) |
| *H01M 4/66* | (2006.01) |
| *H01M 4/13* | (2010.01) |
| *H01M 10/0525* | (2010.01) |
| *H01M 4/04* | (2006.01) |
| *H01M 4/131* | (2010.01) |
| *H01M 4/133* | (2010.01) |

(52) U.S. Cl.
CPC ............ *H01M 10/0583* (2013.01); *H01M 4/13* (2013.01); *H01M 4/663* (2013.01); *H01M 4/667* (2013.01); *H01M 10/0525* (2013.01); *H01M 4/0404* (2013.01); *H01M 4/131* (2013.01); *H01M 4/133* (2013.01)

(58) Field of Classification Search
None
See application file for complete search history.

(56) References Cited

U.S. PATENT DOCUMENTS

| | | | | |
|---|---|---|---|---|
| 4,702,975 | A * | 10/1987 | Fields | 429/100 |
| 6,228,536 | B1 * | 5/2001 | Wasynczuk | 429/233 |
| 2008/0297878 | A1* | 12/2008 | Brown et al. | 359/263 |
| 2010/0190059 | A1* | 7/2010 | Graetz et al. | 429/231.95 |
| 2011/0200873 | A1* | 8/2011 | Hu et al. | 429/188 |

* cited by examiner

*Primary Examiner* — Sarah A Slifka
(74) *Attorney, Agent, or Firm* — Gavrilovich, Dodd & Lindsey, LLP (57) ABSTRACT

The battery includes an electrode having an active medium on a current collector. The active medium includes one or more active materials. The current collector includes or consists of carbon nanotubes. The electrical conductivity and weight of carbon nanotubes permit the weight of the battery to be reduced while the energy density and the power density of the battery are increased.

12 Claims, 6 Drawing Sheets

BATTERY HAVING ELECTRODE WITH CARBON CURRENT COLLECTOR

FIELD

The present invention relates to power sources and more particularly to batteries.

BACKGROUND

A number of battery applications require batteries that have a reduced weight without sacrificing electrical energy. As a result, there is a need for batteries having an increased mass based energy density.

SUMMARY

A battery includes an electrode having an active medium on a current collector. The active medium includes one or more active materials. The current collector includes or consists of carbon nanotubes.

In some instances, the current collector includes a collector layer immobilized on a collector support. The collector layer includes the carbon nanotubes. The collector layer can be formed by printing an ink on the collector layer.

In some instances, the electrode is one of a plurality of electrodes included in the battery and a continuous layer of material that includes the current collector provides electrical communication between several of the electrodes.

A method of generating a battery includes forming an electrode. Forming the electrode includes printing an ink onto a collector support and forming an active medium on the ink that is printed on collector support. The ink includes carbon nanotubes and the active medium includes one or more active materials.

BRIEF DESCRIPTION OF THE FIGURES

FIG. 1A and FIG. 1B illustrate an electrode that is suitable for use in an electrochemical device such as a battery.

FIG. 2A and FIG. 2B illustrate another embodiment of an electrode that is suitable for use in an electrochemical device such as a battery.

FIG. 3A through FIG. 3L illustrate the fabrication of a battery.

FIG. 3F and FIG. 3G illustrate electrical connectors attached to the electrode assembly of FIG. 3E. The electrode assembly of FIG. 3F includes a cross section of the electrode assembly of FIG. 3E taken along the line labeled F in FIG. 3E.

FIG. 3K and FIG. 3L illustrate a pouch cell formed using an electrode assembly constructed according to FIG. 3E and FIG. 3I.

DESCRIPTION

A battery includes one or more positive electrode and/or one or more negative electrodes that employ a current collector that includes or consists of carbon nanotubes. The carbon nanotubes can be present in an amount that makes the carbon nanotubes the dominant electrical current carrier in the electrode. The enhanced electrical conductivity and light weight of carbon nanotubes allow the weight of the battery to be reduced and accordingly provides the battery with an increased energy density and power density. The enhanced electrical conductivity of the carbon nanotubes can also enhance the low temperature performance of the battery.

Further, carbon nanotubes can be included in inks. As a result, a collector layer that includes the carbon nanotubes can be printed on a support using printing techniques such as ink-jet printing, thermal transfer printing, offset and silk-screen printing. As a result, the collector layer can be patterned on the support such that the collector layer provides electrical connections in addition to acting as a collector. For instance, the current collector can be patterned so it provides electrical connections between different electrodes. As a result, the collector layer can replace wires, washers, and other electrical connection components in the battery. The replacement of these components with the collector layer further reduce the weight of the battery.

Carbon nanotubes can also have a higher thermal conductivity than metal foils. As a result, the current collector can provide more efficient heat dissipation from localized hot spots of the electrode to the rest of the electrode. As a result, the carbon nanotubes can extend battery life by preventing the material decomposition and/or preventing thermal runaway which could lead to the explosion of the battery.

Additionally, carbon nanotubes often shown a stronger adhesion to polymer binders used in active media. The enhanced adhesion can prevent or reduce delamination of the electrode and further extend the life of the battery.

Figure 1A:
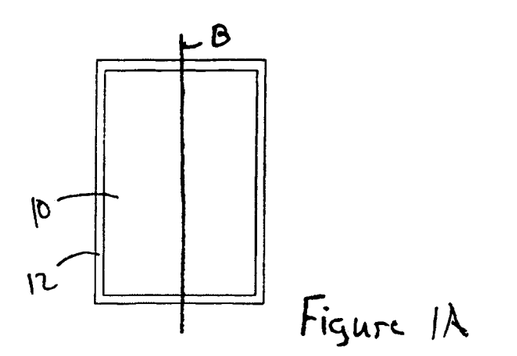
FIG. 1A is a sideview of the electrode.
Figure 1B:
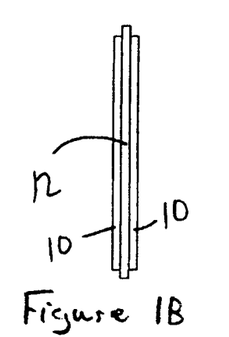
FIG. 1B is a cross section of the electrode taken along the line labeled B in FIG. 1A.

FIG. 1A and FIG. 1B illustrate an electrode that is suitable for use in an electrochemical device such as a battery including a primary battery or a secondary battery. FIG. 1A is a sideview of the electrode. FIG. 1B is a cross section of the electrode taken along the line labeled B in FIG. 1A. The electrode includes an active medium 10 on both faces of a current collector. The active medium includes or consists of one or more active materials. The current collectors are each configured to provide an electrical pathway between the active medium and the terminals of an electrochemical device. The current collector can include or consist of a collector layer 12. Although the active medium 10 is shown positioned on both faces of the current collector, the active medium 10 can be positioned on only one face of the current collector.

Figures 2A, 2B:
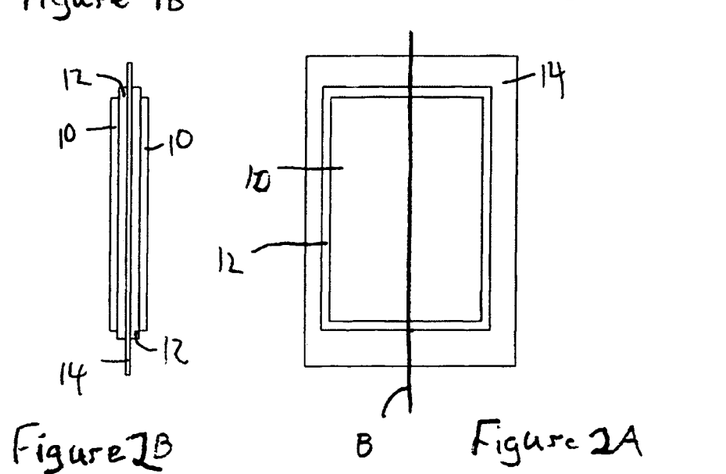
FIG. 2A is a sideview of the electrode.
FIG. 2B is a cross section of the electrode taken along the line labeled B in FIG. 2A.

FIG. 2A and FIG. 2B illustrate another embodiment of an electrode that is suitable for use in an electrochemical device such as a battery. FIG. 2A is a sideview of the electrode. FIG. 2B is a cross section of the electrode taken along the line labeled B in FIG. 2A. The electrode includes an active medium 10 on both faces of a current collector. The current collector includes a collector layer 12 on both faces of a collector support 14. The active medium includes or consists of one or more active materials. The current collectors are each configured to provide an electrical pathway between the active medium and the terminals of an electrochemical device. Although the active medium 10 is shown positioned on both faces of the current collector, the active medium 10 can be positioned on only one face of the current collector. Additionally or alternately, the collector layer 12 can be positioned on one face of the collector support 14.

The collector layer 12 includes or consists of carbon nanotubes. Carbon nanotubes are allotropes of carbon with a cylindrical structure. Carbon nanotubes can have an aspect ratio in a range of 28,000,000 to 1. Suitable carbon nanotubes for inclusion in the collector layer 12 include, but are not limited to single wall nanotubes (SWNT) and multiwall nanotubes (MWNT). Suitable diameter ranges for single wall nanotubes included in the collector layer 12 include, but are not limited to, 1 nm to 5 nm. Suitable diameter ranges for multiwall nanotubes included in the collector layer 12 include, but are not limited to, 5 nm to 100 nm. Suitable lengths for nanotubes included in the collector layer 12 include, but are not limited to, 100 nm to 100 µm.

The collector layer 12 can optionally include materials in addition to the carbon nanotubes. For instance, the collector layer 12 can optionally include materials such as surfactants, binders, conductors and/or diluents. Suitable surfactants include, but are not limited to, carboxymethyl cellulose, non-ionic surfactant such as alkyl poly(ethylene oxide), alkylphenol poly(ethylene oxide), copolymers of poly(ethylene oxide) and poly(propylene oxide), alkyl polyglucosides, fatty alcohols, polysorbates, cationic surfactants such as cetyl trimethylammonium bromide, cetylpyridinium chloride, polyethoxylated tallow amine, benzalkonium chloride, benzethonium chloride, anionic surfactant such as perfluorooctanoate, perfluorooctanesulfonate, sodium dodecyl sulfate, sodium lauryl ether sulfate, alkyl benzene sulfonate, fatty acid salts, amphoteric surfactant such as dodecyl betaine, cocamidopropyl betaine. Suitable binders include, but are not limited to, poly(vinylidene fluoride) (PVDF), poly(tetrafluoro ethylene) (PTFE), poly(styrene-co-butadiene) rubber (SBR), and carboxymethyl cellulose (CMC). Suitable conductors and/or diluents include, but are not limited to, carbon black, carbon fiber, metal particles and metal wires. In some instances, the binders, conductors and/or diluents are present at less than 40 wt %, 20 wt % or 10 wt % of the total weight of the collector layer 12. As a result, the nanotubes can be greater than 60 wt %, 80 wt % or 90 wt % of the total weight of the collector layer 12. Increasing the portion of carbon nanotubes in the collector layer 12 increases the portion of electrical current that is carried by the carbon nanotubes and accordingly increases the positive influence of the carbon nanotubes on the performance of the battery. As a result, the carbon nanotubes are preferably greater than 90 wt % of the collector layer 12.

The collector support 14 can have a variety of forms. For instance, the collector support 14 can be a continuous layer of material, a paper, a woven fabric, or a non-woven fabric. The collector support 14 can have a thickness greater than 0.01 µm, 0.1 µm, or 1 µm and/or less than 50 µm, 100 µm, or 1000 µm. Suitable materials for the collector support 14 include, but are not limited to, polymers, metals, ceramics, and composites of these materials. Suitable polymers for inclusion in the collector support 14 include, but are not limited to, cellulose, aliphatic polymers such as polypropylene and polyethylene, aromatic polymers such as polycarbonate, polyimide, polysulfone, polyketone, conjugated polymers such as polythiophene, polyaniline, polyphenylene vinylene, and copolymers of these polymers. Suitable metals for inclusion in the collector support 14 include, but are not limited to, copper, aluminum, nickel, stainless steel, titanium, platinum and alloys of these metals. Suitable ceramics for inclusion in the collector support 14 include, but are not limited to, silica, alumina, titania, zirconia, and composites of these ceramics. In one example, the collector support 14 is cellulose paper.

The collector layer 12 can be formed on the collector, support 14 using printing techniques such as ink-jet printing, thermal transfer printing, offset and silk-screen printing. These techniques make use of inks that include the carbon nanotubes and solvents. Additionally, the patterning of the collector layer that results from the use of these techniques can eliminate the need to remove portions of the collector layer after the formation of the collector layer. After printing, the printed ink can be dried to form the collector layer 12. Drying of the ink can include evaporation of the solvents from the ink. When the current collector does not include a collector support 14, the current collector can be formed by printing the collector layer 12 onto the collector support 14 and removing the collector support 14 after drying the ink. The collector support 14 can be removed by mechanically peeling the collector support 14 or by dissolving the collector support 14 in a solvent. Alternately, the collector layer can be printed directly on the active medium. In some instance, printing the collector directly on the active medium is followed by forming another layer of active medium on the collector layer in order to provide an electrode having the current collector between layer of active medium.

An electrode according to FIG. 1A through FIG. 2B can be a negative electrode, an anode, a positive electrode, or a cathode. When the electrode is a positive electrode or a cathode, the active medium 10 can be a positive medium. When the electrode is a negative electrode or an anode, the active medium 10 can be a negative medium.

A suitable positive medium includes or consists of one or more positive active materials. Suitable positive active materials include, but are not limited to, $Li_xVO_y$, $LiCoO_2$, $LiNiO_2$, $LiNi_{1-x}Co_yMe_zO_2$ $LiMn_{0.5}Ni_{0.5}O_2$, $LiMn_{(1/3)}CO_{(1/3)}Ni_{(1/3)}O_2$, $LiFePO_4$, $LiMn_2O_4$, $LiFeO_2$, $LiMc_{0.5}Mn_{1.5}O_4$, $LiMn_{1.5}McO_4$, vanadium oxide, carbon fluoride ($CF_{x''}$) and mixtures thereof wherein Me is Al, Mg, Ti, B, Ga, Si, Mn, Zn, Mo, Nb, V and Ag and combinations thereof, and wherein Mc is a divalent metal such as Ni, Co, Fe, Cr, Cu, and combinations thereof. In some instances, x is ≥⅓ before initial discharge of the battery and/or y is in a range of 7/3 to 3 before initial discharge of the battery and/or x' is ≥0 before initial discharge of the battery and/or 1−x'+y'+z'=1 and/or x'' is ≥0 or x'' is ≥0.2 before initial discharge of the battery. Example cathode materials include one or more lithium transition metal oxides selected from the group consisting of $Li_xVO_y$, $LiCoO_2$, $LiNiO_2$, $LiNi_{1-x}Co_yMe_zO_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMc_{0.5}Mn_{1.5}O_4$.

The positive medium can optionally include binders and/or conductors such as PVDF, graphite and acetylene black in addition to the one or more positive active materials. Suitable binders include, but are not limited to, PVdF, powdered fluoropolymer, powdered polytetrafluoroethylene or powdered polyvinylidene fluoride present at about 1 to about 5 weight percent of the positive active material. Suitable conductors and/or diluents include, but are not limited to, acetylene black, carbon black and/or graphite or metallic powders such as powdered nickel, aluminum, titanium and stainless steel.

When the electrode is a positive electrode, the positive medium can be formed on the current collector by forming a positive slurry that includes the components of the positive medium and one or more solvents. The positive slurry is coated on one face of the current collector or on both faces of the current collector. The one or more solvents can then be evaporated from the positive slurry so as to leave the positive medium on the current collector. Suitable solvents include, but are not limited to, one or more components selected from a group consisting of 1-methyl-2-pyrrolidinone, N,N-dimethylformamide, and water.

A suitable negative medium includes or consists of one or more negative active materials. The negative active material can include or consist of a metal selected from Groups IA, IIA and IIIB of the Periodic Table of the Elements. Examples of these negative active materials include lithium, sodium, potassium, etc., and their alloys and intermetallic compounds including, for example, Li—Si, Li—Al, Li—B and Li—Si—B alloys and intermetallic compounds. Alternative suitable negative active materials include lithium alloys such as a lithium-aluminum alloy. The greater the amounts of aluminum present by weight in the alloy, however, the lower the energy density of the cell. Other suitable negative active materials include graphite or other carbon, silicon, silicon oxide, silicon carbide, germanium, tin, tin oxide, $Cu_6Sn_5$, $Cu_2Sb$, MnSb, other metal alloys, $Li_4Ti_5O_{12}$, silica alloys, or mixtures of suitable negative active materials.

The one or more negative active materials can include a carbonaceous mixture. For instance, the carbonaceous mixture can include two or more components selected from a group consisting of carbon beads, carbon fibers, and graphite flakes. The carbon beads can have shapes that approximate blocks, spheres, spheroids, cylinders, cubes or combinations of these shapes. The carbon beads may have a structure that is inherently rigid. Alternatively or additionally, the carbon beads may have a rigid surface layer that makes them difficult to deform. For instance, the carbon beads can have a rigid surface layer that includes hard carbon. Suitable carbon fibers can have a specific surface area of less than 5 $m^2/g$; an average particle size of less than 40 μm and preferably 10-35 μm; a d002 (layer distance) of less than 3.36 Å; and an Lc of greater than 100 nm. The graphite flakes can be natural or artificial graphite flakes. The graphite flakes can be softer than carbon beads.

In some instances, the negative medium includes a binder. When a binder is used in the negative active medium, a suitable binders includes, but is not limited to, PVdF, PTFE, carboxymethyl cellulose (CMC), and styrene butadiene rubber (SBR). When the negative active material includes a carbonaceous mixture, the binder of the negative medium can exclude fluorine, and can include carboxymethyl cellulose (CMC). In some instances, styrene butadiene rubber (SBR) is added to impart elasticity to the mixture.

When the electrode is a negative electrode, the negative medium can be formed on the current collector by forming a negative slurry that includes the components of the negative medium and one or more solvents. The negative slurry is coated on one face of the current collector or on both faces of the current collector. The one or more solvents can then be evaporated from the negative slurry so as to leave the negative medium on the current collector. When the one or more negative active materials include a continuous sheet of material such as lithium metal, the sheet of material can be formed on the current collector by pressing the material on to the current collector, by sputtering or by coating precursor particles.

Figure 3A:
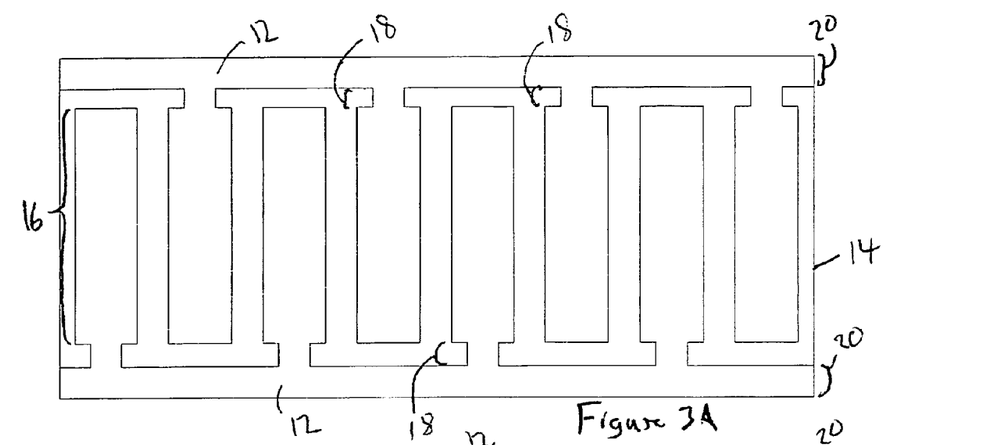
FIG. 3A illustrates a collector layer formed on a support layer. The collector layer is patterned into electrode regions and connectors that each connects one of the electrode regions to a common region.

FIG. 3A through FIG. 3F illustrate the fabrication of a battery. FIG. 3A illustrates a collector layer 12 formed on a flexible and non-conducting collector support 14 such as a layer of cellulose paper. The collector layer 12 is patterned to include a variety of electrode regions 16 and connectors 18 that each connects one of the electrode regions 16 to a common region 20. Connectors 18 that are adjacent to one another on the collector support 14 are connected to different common regions 20. As will become evident below, each of the connectors 18 provides electrical communication between one of the electrodes and one of the common regions 20. Although not evident in FIG. 3A, the collector layer 12 is formed on both sides of the collector support 14.

As discussed above, the collector layer 12 can be formed on the collector support 14 by dip-coating, spin-coating, doctor blade coating or by using printing technique such as ink-jet printing, thermal transfer printing, offset and silk-screen printing. When dip-coating, spin-coating, or doctor blade coating or other large area coating method is used, a desired pattern is created by masking the area that should not be coated. Inkjet printing includes spraying fine drops of ink onto the collector support 14. In some instances, these droplets can are "ionized" which allows them to be directed by magnetic plates in the ink's path. Screen printing is a printing technique that uses a woven mesh to support an ink-blocking stencil. The attached stencil forms open areas of mesh that transfer ink as a sharp-edged image onto a substrate. A roller or squeegee is moved across the screen stencil, forcing or pumping ink past the threads of the woven mesh in the open areas. Screen printing is also a stencil method of print making in which a design is imposed on a screen of silk or other fine mesh, with blank areas coated with an impermeable substance, and ink is forced through the mesh onto the printing surface. It is also known as silk screening or serigraphy.

Figure 3B:
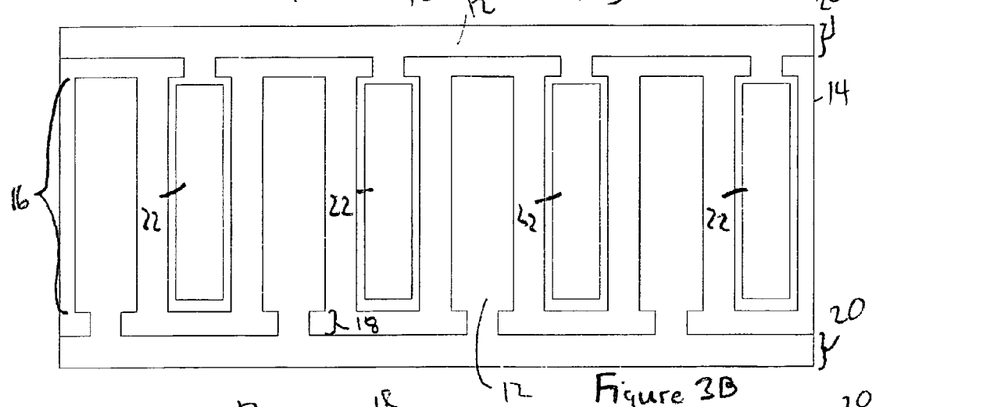
FIG. 3B illustrates the positive medium formed on the electrode regions of the collector layer where the positive electrodes are to be formed.

FIG. 3B illustrates a positive medium 22 formed on the electrode regions 16 of the collector layer 12 where the positive electrodes (or cathodes) are to be formed. For instance, the positive medium 22 is shown on every other electrode region 16. Although not evident in FIG. 3B, the positive medium 22 collector layer 12 is formed on both faces of the collector support 14. When the positive medium 22 is formed on both faces of the collector support 14, the positive medium 22 is formed on corresponding electrode regions 16. For instance, the positive medium 22 is formed on electrode regions 16 that are positioned on opposing faces of the same electrode. The positive medium 22 can be formed on the collector layer 12 using printing technique such as ink-jet printing, thermal transfer printing, offset and silk-screen printing or by traditional techniques such as spreading the positive slurry on the collector layer 12 followed by drying the positive slurry so as to form the positive medium 22.

Figure 3C:
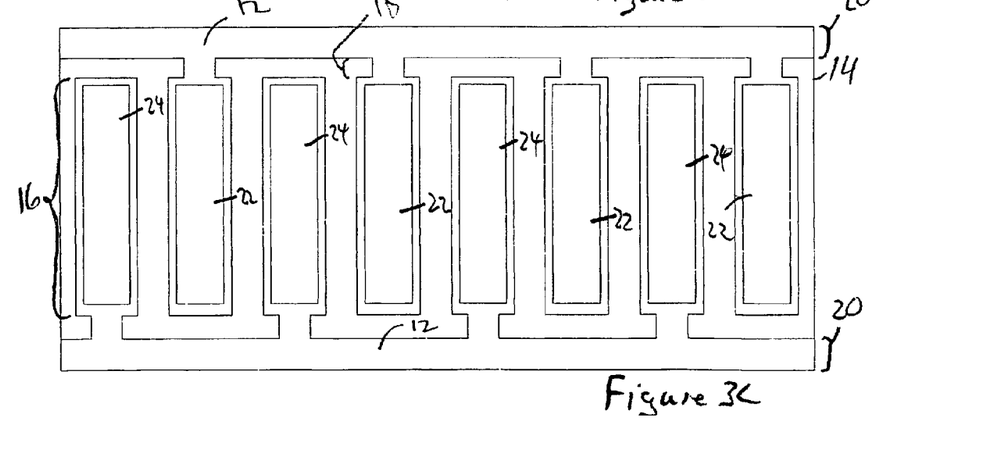
FIG. 3C illustrates the negative medium formed on the electrode regions of the collector layer where the negative electrodes are to be formed.

FIG. 3C illustrates a negative medium 24 formed on the electrode regions 16 of the collector layer 12 where the negative electrodes (or cathodes) are to be formed. For instance, the negative medium 24 is shown on every other electrode region 16. Although not evident in FIG. 3C, the positive medium 22 collector layer 12 is formed on both faces of the collector support 14. When the negative medium 22 is formed on both faces of the collector support 14, the negative medium 24 is formed on corresponding electrode regions 16. For instance, the negative medium 24 is formed on electrode regions 16 that are positioned on opposing faces of the same electrode. The negative medium 24 can be formed on the collector layer 12 using printing technique such as screen printing and ink jet printing or by traditional techniques such as spreading the negative slurry on the collector layer 12 followed by drying the negative slurry so as to form the negative medium 24.

Figure 3D:
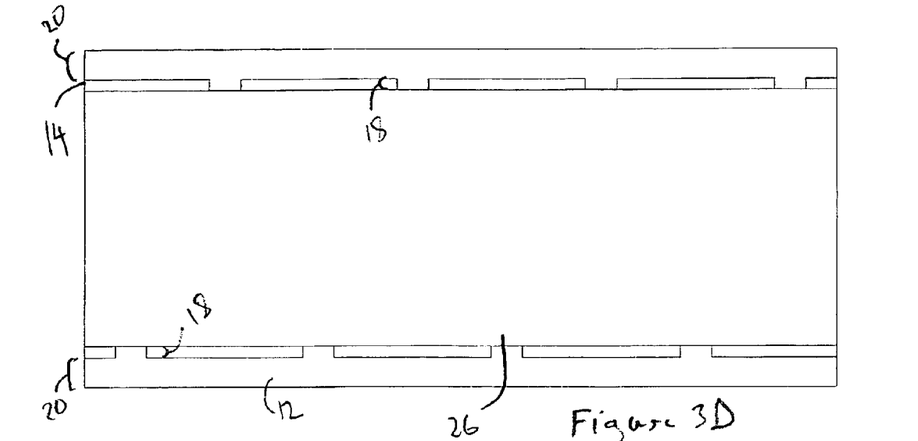
FIG. 3D illustrates a separator positioned over the positive medium and the negative medium.

FIG. 3D illustrates a separator 26 positioned over the positive medium 22 and the negative medium 24. Although not evident in FIG. 3D, the separator 26 is positioned on the positive medium 22 and the negative medium 24 on both sides of the collector support 14.

Figure 3E:
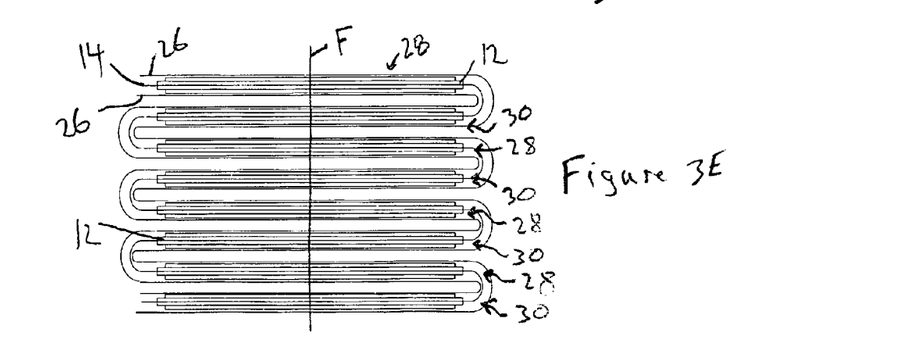
FIG. 3E illustrates the support in the electrode assembly of FIG. 3D folded so as to form a stack of electrodes.

The electrode assembly of FIG. 3D can be folded between adjacent electrode regions 16 so as to form the stack of electrodes shown in FIG. 3E. FIG. 3E is a cross section of the electrode assembly taken through the electrodes. The electrode assembly includes positive electrodes 28 alternated with negative electrodes 30 and includes the separator 26 positioned between adjacent electrodes. The folding of the electrode assembly results in the common regions 20 being folded. The presence of the carbon nanotubes in the collector layer 12 results in a collector layer 12 that is flexible and foldable. Since folding the electrode assembly as shown in FIG. 3E results in the common regions 20 being folded, the presence of the carbon nanotubes in the collector layer 12 permits this folding. Further, as discussed above, carbon nanotubes often shown a stronger adhesion to polymer binders used in active media. The enhanced adhesion between the carbon nanotubes and the active media can prevent or reduce separation between the collector layer 12 and the collector support 14 that could result from the folding of the electrode assembly.

Figure 3F:
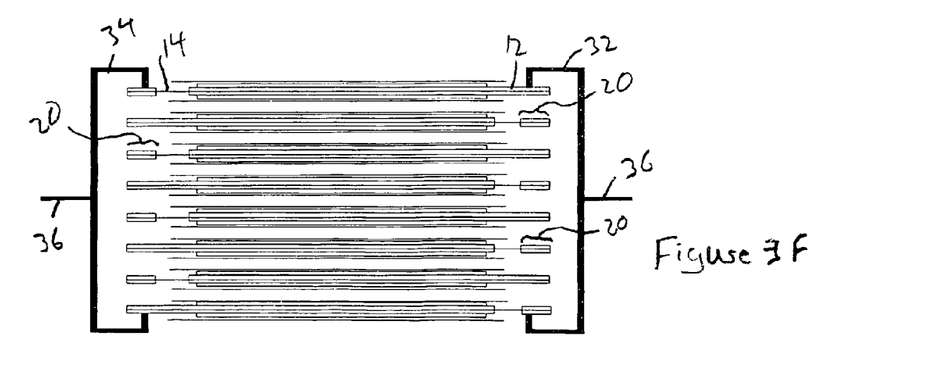
Figure 3G:
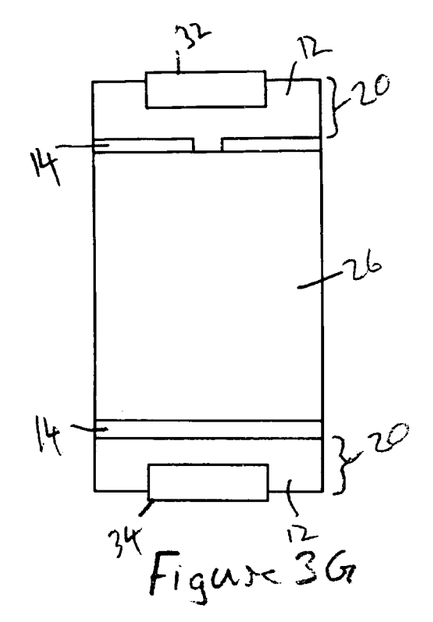
FIG. 3G is a sideview of the electrode assembly shown in FIG. 3F looking down and toward the top of the electrode assembly of FIG. 3F.

As illustrated in FIG. 3F and FIG. 3G, electrical connectors can be added to the electrode assembly of FIG. 3E. The electrode assembly of FIG. 3F includes a cross section of the electrode assembly of FIG. 3E taken along the line labeled F in FIG. 3E. FIG. 3G is a sideview of the electrode assembly shown in FIG. 3F looking down and toward the top of the electrode assembly of FIG. 3F.

A first electrical connector 32 contacts one of the common regions 20 and a second electrical connector 34 contacts the other common region 20. The first electrical connector 32 and the second electrical connector 34 are each electrically conducting. For instance, the first electrical connector 32 includes a first lead 36 and provides electrical communication between the positive electrodes 28 and the first lead 36 and a second electrical connector 34 includes a first lead 36 and provides electrical communication between the negative electrodes 30 and the first lead 36. For instance, the first electrical connector 32 is in electrical communication with the common region 20 that is in electrical communication with each of the positive electrodes 28 and the second electrical connector 34 is in electrical communication with the common region 20 that is in electrical communication with each of the negative electrodes 30. Each of the first leads 36 can optionally serve as a terminal for the battery.

The first electrical connector 32 and/or the second electrical connector 34 can be crimped in order to effectively press different area of a common region 20 together so they contact one another. Alternately, the first electrical connector 32 and/or the second electrical connector 34 can be a clamp or clip that in order to effectively press different area of a common region 20 together so they contact one another. Constructing an electrical connector such that the electrical connector presses different regions of a common region 20 together can enhance the electrical connections within the battery and can stabilize the electrical connector relative to the stack of electrodes.

Figure 3H:
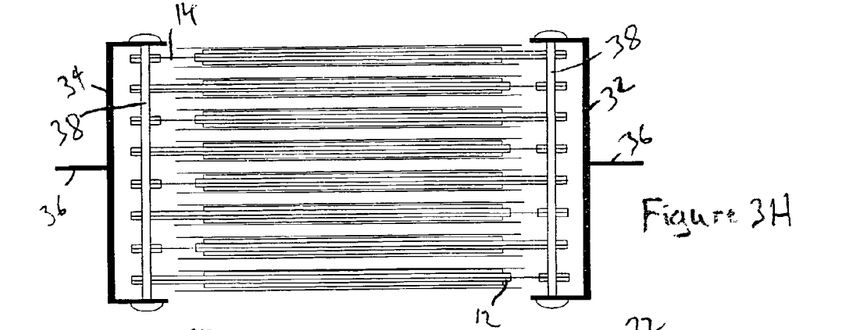
FIG. 3H illustrates electrical connectors attached to the electrode assembly of FIG. 3E. An electrical conductor extends through openings in the common regions of the collector layer.

In addition to, or as an alternative to, construction of an electrical connector such that the electrical connector presses different regions of a common region 20 together, an electrical conductor 38 can extend through openings in the common regions 20 as illustrated in FIG. 3H. All or a portion of the openings can surround an electrical conductor 38. The electrical conductors 38 can also be in electrical communication with the electrical connector. As a result, an electrical connector can provide electrical communication between the electrodes and the electrical connector. Suitable electrical conductors 38 include, but are not limited to, rivets.

Figure 3I:
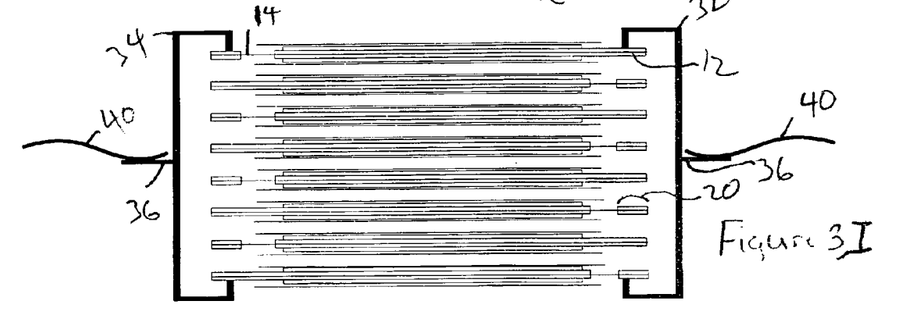
FIG. 3I illustrates electrical connectors attached to the electrode assembly of FIG. 3E. Second leads are each attached to a first lead on one of the electrical connectors.

As shown in FIG. 3I, one or more of the first leads 36 can optionally be attached to a second lead 40 such that the second lead 40 is in electrical communication with the first lead 36. The second leads 40 can be electrically conducting and can serve as the terminal for the battery. Suitable methods for connecting the first lead 36 and the second lead 40 include, but are not limited to, welding such as sonic welding.

Figure 3J:
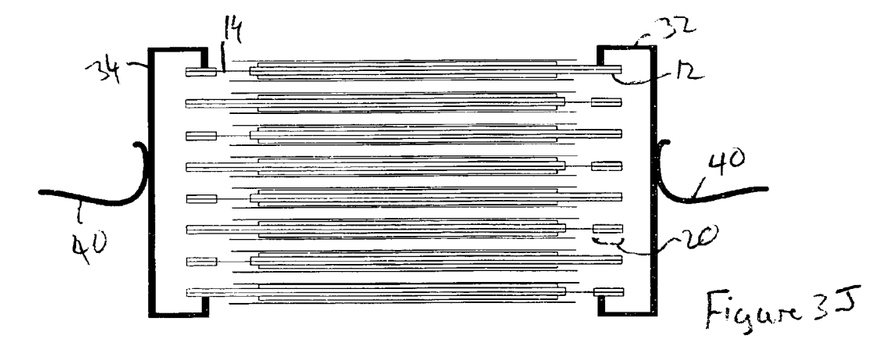
FIG. 3J illustrates electrical connectors attached to the electrode assembly of FIG. 3E. Second leads are each attached to directly to one of the electrical connectors.

As shown in FIG. 3J, in some instances, the first electrical connector 32 and/or the second electrical connector 34 exclude the first lead 36. In these instances, a second lead 40 can optionally be attached to directly to an electrical connector such that the second lead 40 is in electrical communication with the electrical connector. The second leads 40 can electrically conducting and can serve as the terminal for the battery. Suitable methods for connecting the electrical connector and the second lead 40 include, but are not limited to, welding such as sonic welding.

The electrical connectors and/or electrical conductor 38 can be constructed of electrically conductive materials including metals such as nickel, aluminum, copper, stainless steel, titanium and alloys that include one or more of these metals. An electrical connector and/or electrical conductor 38 in electrical communication with one or more positive electrodes 28 can be constructed of a different material than an electrical connector and/or electrical conductor 38 in electrical communication with one or more negative electrodes 30. For instance, an electrical connector and/or electrical conductor 38 in electrical communication with one or more positive electrodes 28 can be constructed of aluminum and an electrical connector and/or electrical conductor 38 in electrical communication with one or more negative electrodes 30 can be constructed of nickel.

Figure 3K:
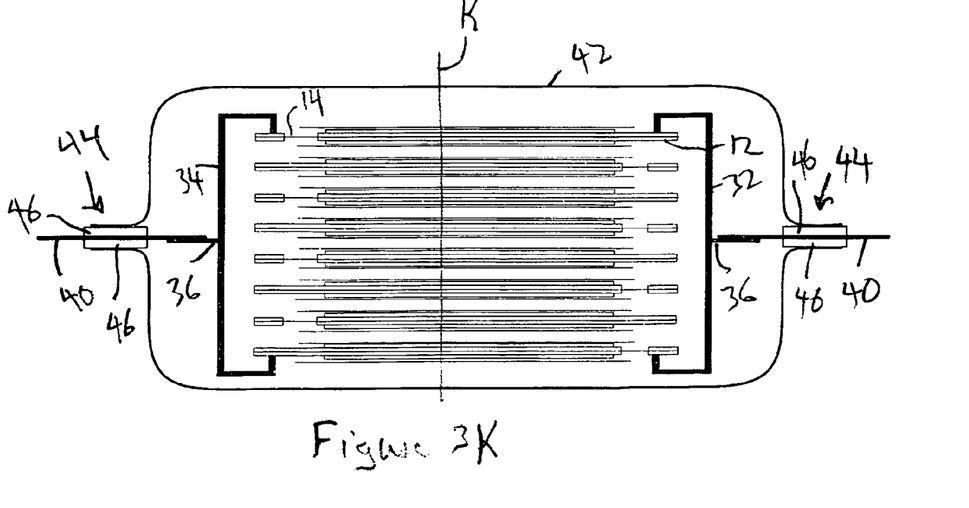
FIG. 3K is a cross section through the pouch cell taken at the same on the electrode assembly as the cross section of FIG. 3I.
Figure 3L:
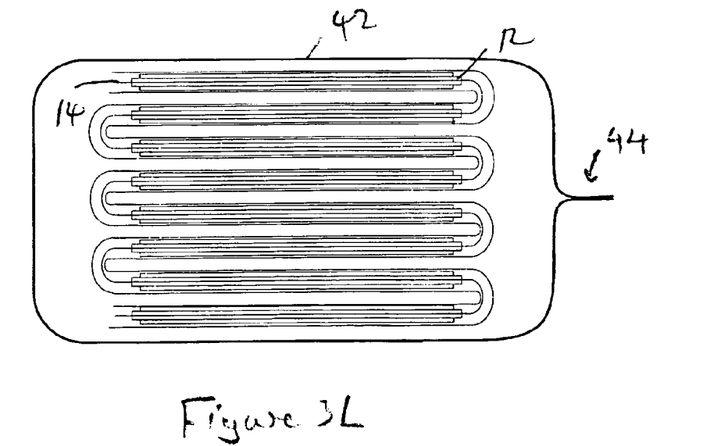
FIG. 3L is a cross section through the pouch cell taken at the along the line labeled K in FIG. 3K.

A pouch cell can include electrode assemblies constructed according to any one of FIG. 3F through FIG. 3J. For instance, FIG. 3K and FIG. 3L illustrate a pouch cell formed using an electrode assembly constructed according to FIG. 3E and FIG. 3I. FIG. 3K is a cross section through the pouch cell taken at the same on the electrode assembly as the cross section of FIG. 3I. FIG. 3L is a cross section through the pouch cell taken at the along the line labeled K in FIG. 3K.

The pouch 42 serves as a case for the battery and includes one or more seams 44 where different portions of the pouch 42 are attached to one another. In locations were a first lead 36 or a second lead 40 extends through a seam 44 in the pouch 42, a sealant 46 can be located between pouch 42 and the first lead 36 or second lead 40. The sealant 46 can prevent or reduce leakage of a liquid electrolyte from within the pouch cell. Suitable materials for the sealant 46 include, but are not limited to, polyethylene, polypropylene, and co-polymers of these materials.

The pouch 42 can include one or more layers. In one example, the pouch 42 includes a base layer between a protective layer and a sealant layer. Suitable materials for the base layer include, metals such as aluminum, titanium, stainless steel, copper, nickel. Suitable materials for the protective layer include, but are not limited to, nylon and polyester. Suitable materials for the sealant layer include, but are not limited to, sealant 46 such as polyethylene, polypropylene, and co-polymers of these materials.

The pouch 42 is folded such that the sealant layer is on an interior of the cell. The seams 44 can be formed by heating regions of the pouch 42 such that the sealants 46 in the one or more seams 44 bond to one another. For instance, one or more seams 44 can be formed by heating regions of the pouch 42 such that the sealant layer on opposing side of the seam 44 bond to one another and/or such that the sealant 46 bonds to the sealant layer.

Although FIG. 3A through FIG. 3F illustrate an electrode stack having electrodes arranged along a folded collector support 14, the electrodes can be independent from one another.

Although FIG. 3A through FIG. 3F illustrate an electrode assembly having multiple positive electrodes and multiple negative electrodes, the electrode assembly can have one or more positive electrodes and one or more negative electrodes.

Although a pouch is disclosed as serving as the case for the battery, other case constructions are possible. For instances, a traditional metal case could serves as the case for the battery. In this case, the inside of the metal case can be covered with non-conductive material such as the same material used as separator 26. The terminals can be are connected to the electrodes using a feed-through assembly.

EXAMPLE 1

Multiple collector sheets were prepared that each has a collector layer on both faces of a support layer. Cellulose paper served as the support layer. The collector layer included carbon nanotubules. The collector layer was formed on the cellulose paper by immersing the cellulose paper in ink that included carbon nanotubes. The resulting collector layer was about 96 wt % carbon nanotubes.

A negative electrode was generated by preparing a mixture that was 91.5 wt % Mesocarbon Micro Beads (MCMB), 0.5 wt % acetylene black, and 8 wt % polyvinylidene. The mixture was combined with 1-methyl-2-pyrrolidinone to generate a slurry. The slurry was spread to a thickness of about 100 µm on one of the collector sheets with using a doctor blade. The result was dried in air at 80° C. for 1 h and at 110° C. in vacuum.

A positive electrode was generated by preparing a mixture that was 91 wt % Lithium cobalt oxide 91%, 6 wt % acetylene black, and 3 wt % polyvinylidene fluoride 3%. The mixture was combined with 1-methyl-2-pyrrolidinone to form a slurry. The slurry was spread to a thickness of about 100 µm on one of the collector sheets with using a doctor blade. The result was dried in air at 80° C. for 1 h and at 110° C. in vacuum.

The positive electrode and the negative electrode were stacked with a 16 um Tonen separator positioned between them.

A nickel electrical connector was connected to the negative electrode such that the nickel electrical connector is in electrical communication with the collector layer of the negative electrode. An aluminum electrical connector was connected to the positive electrode such that the aluminum electrical connector is in electrical communication with the collector layer of the positive electrode.

A nickel second lead with a plastic sealant was sonic-welded to the nickel electrical connector. An aluminum second lead with the plastic sealant was sonic-welded to the aluminum electrical connector.

The electrode assembly was packaged in a pouch sheet that has a base layer between a protective layer and a sealant layer. The seams through which the second leads extend were heat sealed leaving another seam unsealed.

An electrolyte having LiPF6 dissolved in a mixture of ethylene carbonate and diethyl carbonate was used. The electrolyte was poured into the pouch through the open seam.

The pouch was put in a vacuum chamber and degassed. Then, the open seam was heat sealed under vacuum.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A battery, comprising:
an electrode having an active medium on a current collector,
the active medium including one or more active materials,
the current collector including carbon nanotubes,
a continuous layer of material that includes the current collector being immobilized on a collector support,
the electrode being one of a plurality of electrodes included in the battery,
multiple of the electrodes being immobilized on the collector support, and
the layer of material includes the current collector for each of the electrodes such that each of the current collectors include the carbon nanotubes.

2. The battery of claim 1, wherein the layer of material provides electrical communication between the multiple electrodes immobilized on the collector support.

3. The battery of claim 1, wherein the collector support is folded such that the electrodes on the collector support are arranged in a stack.

4. The battery of claim 3, wherein the layer of material is folded.

5. The battery of claim 4, wherein the current collector is folded.

6. A battery, comprising:
an electrode having an active medium on a current collector,
the active medium including one or more active materials,
the current collector including carbon nanotubes,
the electrode being one of a plurality of first electrodes included in the battery,
each of the first electrodes includes a different first current collector and each of the first current collectors includes the carbon nanotubes; and
a continuous layer of material is immobilizied on a collector support,
the layer of material includes the first current collectors and provides electrical communication between the different first current collectors.

7. The battery of claim 6, wherein an electrical connector presses together different regions of the layer of material.

8. The battery of claim 7, wherein the electrical connector crimps together the different regions of the layer of material.

9. The battery of claim 6, wherein the layer of material includes connectors that provide electrical communication between the different first current collectors and an electrical connector presses together different regions of the connectors.

10. The battery of claim 6, further comprising:
second electrodes that each includes a different second current collector;
a second continuous layer of material immobilized on the collector support, the second layer of material includes the second current collectors and provides electrical communication between the different second current collectors.

11. The battery of claim 10, wherein the second current collectors each includes carbon nanotubes.

12. The battery of claim 10, wherein the first current collectors alternate with the second current collectors on the support.

* * * * *